G. G. GROSS.
WINDSHIELD ATTACHMENT.
APPLICATION FILED OCT. 11, 1920.
1,394,084.
Patented Oct. 18, 1921.
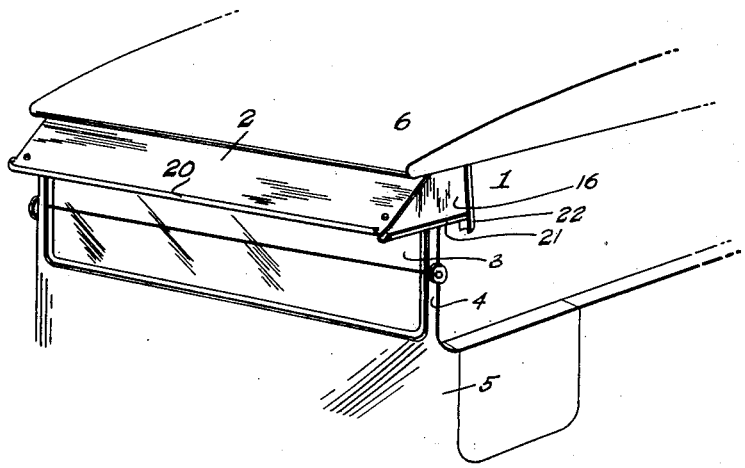
FIG.1.
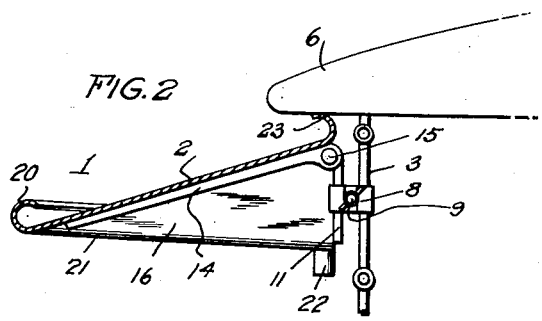
FIG.2.
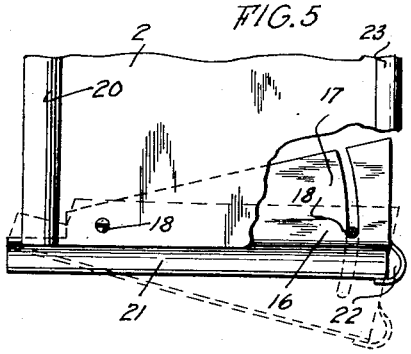
FIG.5.
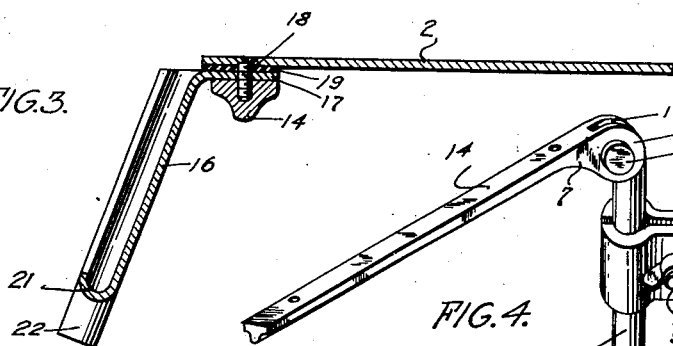
FIG.3.
FIG.4.
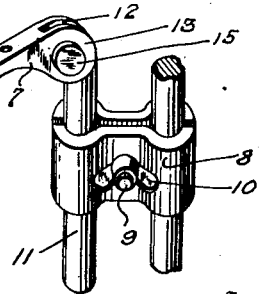
Inventor
George G. Gross
By
C. C. Shepherd
Attorney

UNITED STATES PATENT OFFICE.

GEORGE G. GROSS, OF COLUMBUS, OHIO.

WINDSHIELD ATTACHMENT.

1,394,084.     Specification of Letters Patent.     Patented Oct. 18, 1921.

Application filed October 11, 1920. Serial No. 415,979.

*To all whom it may concern:*

Be it known that I, GEORGE G. GROSS, a citizen of the United States, residing at Columbus, in the county of Franklin and State of Ohio, have invented certain new and useful Improvements in Windshield Attachments, of which the following is a specification.

This invention relates to an improved attachment for the wind shields of motor vehicles, the primary object thereof being to provide the upper and outer portion of a wind shield with an attachment which will serve to prevent water or other moisture from collecting upon the glass panels of the wind shield and in this manner will enable the operator of the vehicle to obtain a clear and unobstructed vision through the wind shield irrespective of adverse weather conditions.

Another object of the invention resides in forming the attachment from an opaque material, in order that when in use, said attachment will serve in the capacity of a sun shield and will prevent the glare of the sun from interfering with the vision of the vehicle operator, a feature which is of very considerable importance when a vehicle is being driven in such a direction that the sun rays will be ordinarily capable of striking the driver in the eyes and thus causing uncomfortable driving.

In carrying out the invention, use is made of a protecting attachment of the aforesaid character which includes a main opaque panel member disposed to extend longitudinally of and at a vertical angle to the upper portion of a vehicle wind shield, said member having its ends formed with triangular sides which assist in preventing moisture or sun glare from striking the protected parts of the wind shield, and in the inclusion of a bracket structure, which operates to adjustably and removably connect the attachment to the flare of a wind shield and to maintain the attachment in a secured operative position in combination with the wind shield and the associated vehicle top.

A further object of the invention resides in forming the marginal edges of the main panel member and its connected sides with outwardly turned flanges which constitute moisture removing gutters, the gutters of the main panel member and the side members being disposed in communication, whereby in the operation of the attachment, moisture will be collected and carried away by said gutters in such manner that said moisture may be discharged without striking or coming into contact with the glass panels of the wind shield.

Other objects of the invention reside in the attachment of the aforesaid character which will be durable, simple and efficient in construction and design and which may be readily and securely connected in coöperative relationship with the associated wind shield; in constructing the bracket structure so that the attachment may be adjusted vertically and also angularly with respect to the upper portion of the wind shield, and to provide a secure and waterproof joint between the upper edge of the panel member and the under portion of the vehicle top.

With these and other objects in view, as will appear as the description proceeds, the invention accordingly consists in the novel features of construction, combinations of elements and arrangements of parts, hereinafter to be fully described and to have the scope thereof pointed out in the appended claims.

In the accompanying drawing, forming a part of this specification, and in which similar characters of reference denote like and corresponding parts:

Figure 1 is a perspective view showing the application of the attachment comprising the present invention to the wind shield of a motor vehicle.

Fig. 2 is a vertical transverse sectional view taken through the attachment and illustrating its application to associated parts of a motor vehicle.

Fig. 3 is a vertical longitudinal sectional view, disclosing more particularly the connection between the main panel member of the attachment and one of its sides, and, Fig. 4 is a detail view of one of the attaching brackets.

Fig. 5 is a detail plan view showing more particularly the relation between the main panel member and the associated side members, parts of the panel member being broken away to disclose the underlying construction of the side members.

Referring more particularly to the details of the invention, my improved attachment, which is designated in its entirely by the numeral 1, is formed to include a main panel member 2. This member is preferably formed from an opaque material, such for instance as sheet metal, which material has the advantage of being strong and substantial and may be readily employed in the protecting of the attachment. As shown, the panel member 2 is adapted to extend longitudinally and parallel with the upper portion of a wind shield 3 and on a vertical angle with respect thereto. The wind shield 3 may be of any standard construction and preferably includes a frame 4 which is secured in any suitable manner with the body 5 of the vehicle. Also the forward portion of the top 6 of the vehicle is connected as usual with the upper part of the frame 4, said top extending slightly beyond or in advance of the adjoining portions of the frame 4.

In order to connect the attachment in a secured manner with the wind shield, use is made of a bracket structure 7, which in the form illustrated comprises a pair of clamps 8. These clamps are each formed to comprise a pair of separable sections through which securing bolts 9 are adapted to pass. By providing the bolts 9 with wing nuts 10 or their equivalents, it is manifest that pressure may be exercised upon the separable sections of the clamps so as to draw the latter into holding engagement with the frame 4 of the wind shield. Also, when so positioned, the clamps 8 are adapted to receive vertically extending rods 11, which are held against movement by the grip exercised thereon by the clamps 8, the upper ends of said rods being provided with enlarged ears 12, which are apertured and are designed to register with similarly apertured ears 13 provided upon arms 14 which are secured to the under side of the attachment 1. Pivots 15 are designed to pass through the apertures provided in the ears 12 and 13 so as to securely yet movably unite said ears together. By this bracket construction, it will be manifest that the attachment 1 may be mounted at desired and advantageous positions upon the wind shield 3 and will be securely held in applied relationship therewith, yet may be removed in a convenient manner if occasion should demand. It will be observed that by the provision of the rods 11, the attachment may be adjusted vertically with respect to the wind shield, and also by the apertured ear construction said attachment may be vertically oscillated in order that the same will assume any desired angular position with respect to the wind shield. When positioned as shown in the drawings, the attachment will serve to eliminate sun glare and also moisture collection upon the panels of the wind shield 3, thus permitting the vehicle to be comfortably and safely operated without inconvenience on the part of the operator.

In the form of the invention illustrated, the panel member 2 is provided with sides 16. These sides are also formed from sheet metal and have the edges thereof adjoining the longitudinal ends of the member 2 provided with inwardly projecting flanges 17, which are suitably apertured to receive threaded fastening elements 18, the latter being threaded into sockets provided in the bracket arms 14. Manifestly, by tightening the elements 18, it will be apparent that the sides 16 may be removably yet firmly secured to the ends of the member 2. If desired, a strip of yieldable material 19 may be inserted between the flanges 17 and the under surfaces of the member 2, a feature which prevents rattling and also materially assists in securing the parts together. By the inclusion of the sides 16, the attachment is enabled to prevent all sun glare from striking the eyes of the vehicle operator, and also moisture is effectively precluded from engaging or contacting with the glass panels of the wind shield. By connecting these sides with the ends of the member 2 in the manner stated, convenience is to be obtained as well as economy in the manufacture of the attachment, but it is obvious that it is within the scope and spirit of the invention to form the sides 16 integral with the panel member instead of separable. However, by the construction described, the threaded elements 18 serve to secure the sides in connection with the member 2 and also serve in the added function of effecting the securing of the arms 14 to the attachment.

Another important feature of the invention resides in forming the lower edge of the member 2 with an outwardly turned flange 20, which provides a gutter along the lower longitudinal edge of said member 2 for the purpose of preventing moisture from dripping downwardly from the attachment in an uncontrolled manner and then striking the wind shield 3. However, by the provision of the flange 20, water will be conveyed toward the ends of the member 2, where it will be discharged into gutters or channels provided by outwardly turned flanges 21 formed with the bottom edges of the sides 16. Also the sides 16 have their rear or vertical edges formed with outturned flanges 22, which provide vertical gutters, into which the gutters formed by the flanges 21 may discharge their contents. Thus, by the flange construction recited, moisture falling upon the attachment will be collected in the several gutters described and will be caused to flow in a regulated manner so that the same may be discharged from the lower portion of the gutters formed by the flange 22. So discharged, the moisture will not strike the wind shield 3, and thus the attachment will serve to prevent the clouding of the wind shield by reason of moisture collection thereon. Also, the upper edge of the member 2 is provided with an outturned flange 23, which is so disposed as to engage the under portion of the top 6. This flange 23 serves as an abutment, and limits the downward swinging movement of the panel member 2, thus maintaining the latter in its adjusted angular position with respect to the wind shield, also by reason of the flange 23 a water-tight joint will be provided between the same and the top 6, which prevents undue moisture seepage between the attachment and said top.

In view of the foregoing description, taken in conjunction with the accompanying drawing, it will be apparent that the present invention provides a simple, durable and efficient protecting attachment for wind shields, and one wherein the construction is such as to insure a clear and unobstructed vision through the transparent panel of an associated wind shield and also by reason of the opaque construction of the attachment, sun glare is eliminated by the shade provided by the attachment, the combination of features thus afforded by the attachment serving to permit a vehicle to be comfortably and safely operated. The construction of the attachment is such as to enable the same to be conveniently applied to any standard form of wind shield and to be adjusted to suit the particular demands of each vehicle upon which it is used. The device may be economically purchased and readily applied and by reason of its simplified construction, it is not likely to become out of order, adjustment or to occasion repairs.

It will be observed, upon reference to Fig. 5, that the side members 16 are capable of being laterally adjusted and to this end the flanges 17 therefor are substantially integral in configuration, the same being larger at their rear ends than at their forward ends. By this construction the side members may be pivotally adjusted about axes defined by the forward fastening elements 18, a feature which enables the sides to be angularly adjusted so that moisture discharged therefrom will be delivered to points considerably away or to one side of the wind shield construction 3.

What is claimed is:

1. A protecting attachment for wind shields comprising a panel member disposed to extend parallel with and on a vertical angle to the upper portion of a wind shield, a bracket structure operable to adjustably connect the attachment with the frame of the wind shield, a gutter disposed to extend longitudinally with the lower edge of the panel member, side members provided at the ends of the panel, gutters provided upon the lower edges of said side members and arranged in communication with the gutter of said panel, and a pivotal connection between said side members and bracket structure, said connection serving to permit of lateral adjustment on the part of said side members to regulate the discharge of water from the gutters thereof.

2. A protecting attachment for wind shields comprising a panel member arranged to extend parallel with and on a vertical angle to the upper portion of a wind shield, a bracket structure operable to connect the panel member with the frame of the wind shield, sides provided contiguous to the longitudinal ends of said panel member, communicating gutters formed with said panel member and sides, substantially vertically extending gutters formed with said sides, and a connection between said sides and bracket structure permitting of lateral adjustment of said sides with respect to said panel member.

In testimony whereof I affix my signature.

GEORGE G. GROSS.